2 Sheets—Sheet 1.

H. K. KRIEBEL,

Assignor of one-half interest to F. LIGHT, Jr.

Portable Steam Engine.

No. 9,351. Reissued Aug. 24, 1880.

Attests
L. J. Milros.

Inventor
Hosea K. Kriebel
By his atty.

N. PETERS, PHOTO-LITHOGRAPHER, WASHINGTON, D. C.

2 Sheets—Sheet 2.

H. K. KRIEBEL,

Assignor of one-half interest to F. LIGHT, Jr.

Portable Steam Engine.

No. 9,351. Reissued Aug. 24, 1880.

Attest:

L. J. Máros.

Inventor

Hosea K. Kriebel.

By his atty.

N. PETERS, PHOTO-LITHOGRAPHER, WASHINGTON, D. C.

UNITED STATES PATENT OFFICE.

HOSEA K. KRIEBEL, OF WEST POINT, PENNSYLVANIA, ASSIGNOR OF ONE-HALF INTEREST TO FREDERICK LIGHT, JR., OF GONZALES, TEXAS.

PORTABLE STEAM-ENGINE.

SPECIFICATION forming part of Reissued Letters Patent No. 9,351, dated August 24, 1880.

Original No. 222,996, dated December 30, 1879. Application for reissue filed July 21, 1880.

*To all whom it may concern:*

Be it known that I, HOSEA K. KRIEBEL, of West Point, in the county of Montgomery and State of Pennsylvania, and formerly of Gonzales, Texas, have invented new and useful Improvements in Portable Steam-Engines, of which the following is a specification, reference being had to the accompanying drawings, which form part thereof.

My invention relates to that class of engines in which there is no connecting-rod and the cylinder oscillates on trunnions or bearings; and my invention consists in certain improvements in reversible steam-engines, and which are fully set forth in the following specification, shown in the accompanying drawings, and referred to in the appended claims.

Figure 1:
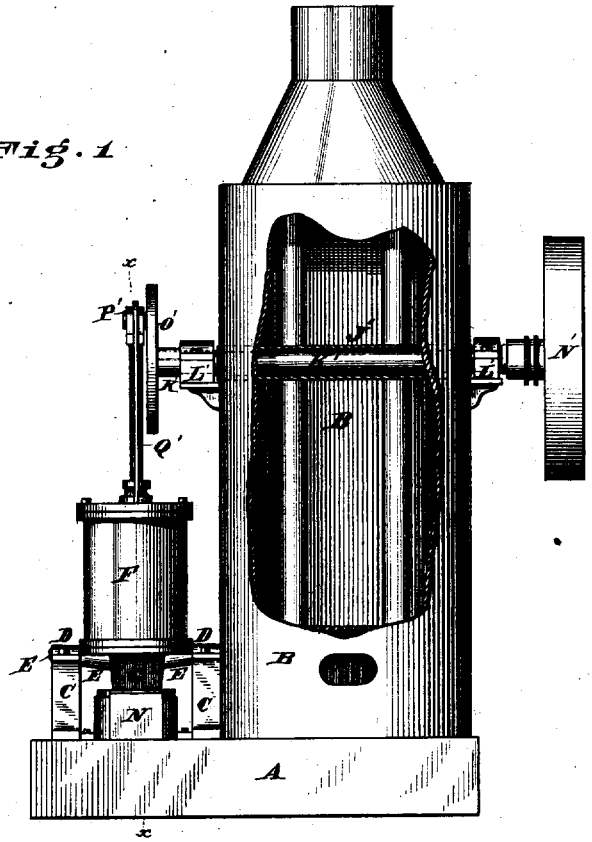
Figure 2:
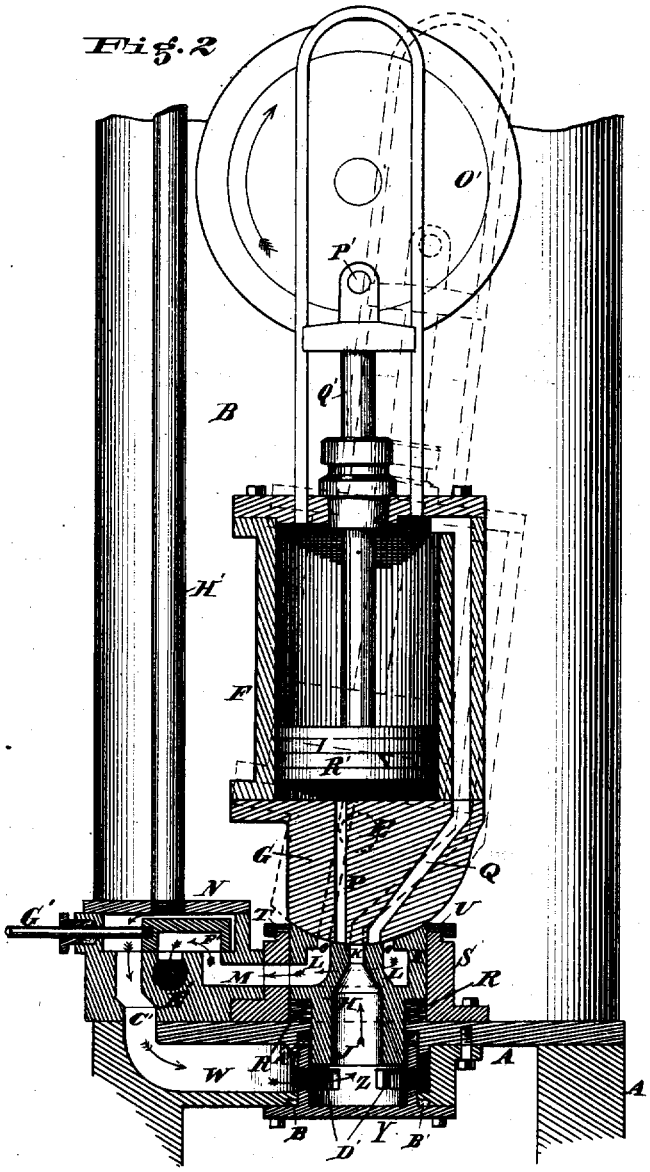
Figure 3:
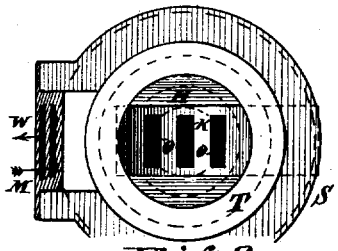

In the drawings, Figure 1 is a side view of my improved portable steam-engine, showing the method of using the cylindrical boiler as the standard to support and carry the engine-shaft. Fig. 2 is a vertical section of the engine on the line *x x*, and shows the boiler in the rear. Fig. 3 is a plan of the steam-chest, casing, and reversing-valve.

A in the drawings refers to the base supporting the boiler B and uprights C C, having boxes or bearings D D for the trunnions E E of the oscillating cylinder F. The lower end of the latter is provided with a solid box or chest, G, the lower semi-cylindrical side of which is seated in the vertically-sliding valve-chest H. The latter consists of a cylindrical or other conveniently-shaped body, I, having a central downward-projecting stem, J. A longitudinal perforation, K, extends through the stem and body, and the latter is provided with an annular chamber, L, having on one side an opening, M, by which it is connected with the steam-chest N. On opposite sides of the central opening or port, K, the annular chamber L is provided with openings or ports O O for the passage of steam into the cylinder. An opening, P, extends through the box G of the latter to the bottom of the cylinder. Another passage, Q, extends upward along the side of the cylinder, and opens into the top of the latter, as shown. The lower ends of the passages P Q are made to register with the ports O K.

The upper cylindrical portion of the valve-chest H forms an annular flange, by which it is supported upon springs R, resting upon the base A, the effect of said springs being to force the valve-chest upward against the cylinder, forming a steam-tight working joint with the latter.

The valve-chest may be made of any desirable shape, and may be forced up against the box of the cylinder by any other arrangement of the springs, the main feature being the vertically-sliding and self-adjusting valve-chest.

The valve-chest is inclosed in a casing, S, the cover of which, T, is recessed to form a circumferential stuffing-box, U, in which suitable packing may be placed to prevent the escape and waste of steam.

In the base A an opening, V, is provided for the accommodation of the stem J. In a suitable box or casing, W, arranged under the base A, an opening, X, is provided to receive a cap, Y, having a cylindrical rim, Z, fitting around the stem J, and forming a guide for the latter. For the accommodation of the upper end of the rims Z, an annular recess, A′, serving as a stuffing-box, is formed in the under side of base A, and a similar recess or stuffing-box, B′, is formed for the cap Y in the casing W. The rim Z is furnished with one or more openings, D′.

The steam-chest N, as above stated, is connected with the annular recess L in the valve-chest H. At its opposite end a passage, C′, connects it with the casing or chamber W, and through openings D′ in the rim Z with the central chamber, K, in the valve-chest H.

Located centrally in the side of the steam-chest is the exhaust-port E′, which, together with one of the steam-ports, may be covered by a sliding cup-valve, F′, which is of the usual construction, and operated by a rod or handle, G′. Connected to the steam-chest, at any suitable point, is the steam-pipe H′, by which steam is conducted from the boiler to the engine.

The boiler B (in the drawings hereto annexed a vertical flue-boiler is shown, but any other kind may be used if desired) is provided with a transversely-located tube, J′, forming a casing for the main shaft K′. This tube J is firmly riveted in the boiler B, so as to be steam-tight, and is slightly larger than the main shaft K′. The shaft K′ is supported in bearings carried by brackets L′, which are bolted or otherwise secured to the boiler. One end of the shaft K′ is provided with the balance-wheel N′, and the other or engine end is provided with the crank-wheel O′, carrying the crank-pin P′, to which the piston-rod Q′ is pivoted in the usual manner.

From the foregoing description, and by reference to the drawings hereto annexed, the operation and advantages of my invention will be readily understood by those skilled in the art to which it appertains.

In the drawings the slide-valve F′ is shown to be in such a position as to cover the passage leading to the chamber L of the valve-chest and the exhaust-port. The steam coming from the boiler passes into the steam-chest N, through passage C′, into the chamber W, from thence through the openings D′ in the rim Z into the central chamber or opening, K, of the valve-chest. In the drawings the said opening is shown to register with the passage Q in dotted lines, Fig. 2, through which the steam is thus conducted to the top of the cylinder, where the downward pressure is exerted upon the piston. The steam confined below the latter is, by the down motion, forced out through the unobstructed opening or port O into the annular chamber L, through opening M into the steam-chest, and under valve F′ to the exhaust-port. The down motion of the piston-rod partly rotates the crank wheel or disk, to which its upper end is pivoted, thus oscillating or reversing the position of the cylinder and bringing the opening over the steam-entrance K, from which steam is thus admitted into the bottom of the cylinder, forcing the piston upward and causing the steam to exhaust from the top of the cylinder.

By reversing the position of the valve F′ the steam is admitted into the annular chamber L, and from the openings O of the latter into the cylinder, while the exhaust is through the chamber K, thus reversing the operation of the engine and the direction of rotation of the main shaft.

By running the main shaft through a tube in the boiler, as described, space is economized and a firm foundation is insured, and the boiler acts as the standard to support the main shaft and its appendages.

For obvious reasons this part of my invention is especially adapted to portable engines.

I do not confine myself to the particular construction shown and described, for many modifications of the same may be made without in anywise altering my invention.

Reversible oscillating engines have been made in which the cylinder is revolved upon its axis to change the direction of motion, and oscillated upon a solid immovable valve-chest, the surface of contact being spherical in shape; but I am not aware that an oscillating engine has ever been constructed to oscillate in rigid bearings and provided with a vertically self-adjusting valve-chest. By this construction the relative positions of the cylinder and main shaft never change, as any wear upon the surface of contact between the cylinder and valve-chest is taken up in the chest, and not by the cylinder, as is the case with other constructions.

If desired, the trunnions of the cylinder may be at the middle instead of the ends, and the box or chest G attached to one of said trunnions or against the side of the cylinder F for the purpose of equalizing the length of the steam-ports in the cylinder.

I am aware of the patent to Baxter, August 20, 1878, and I claim nothing therein shown.

In practice I find that when the stroke of the piston is great it becomes advisable to guide the piston-rod, and to do this I place on one or both sides of the piston-rod, and secured to the cylinder-head, one or two rods or bars, H′, which may be joined at the top, and which oscillate with the cylinder. A cross-head or link, I′, rigidly attached to the piston-rod, slides against or over such guide-rods.

Having now described my invention, what I claim as new, and desire to secure by Letters Patent, is—

1. The combination, with the vertically-sliding valve-chest H, supported upon springs R and having stems J, of the cap Y, having rim Z, and the stuffing-boxes, arranged as herein described, substantially as and for the purpose set forth.

2. In a reversible oscillating steam-engine constructed substantially as herein described, the combination of the vertically-sliding valve-chest H, supported upon springs R, casing S, cover T, and cap Y, having rim Z, as set forth.

3. A self-adjusting vertically-sliding valve-chest provided with steam and exhaust ports in a surface curved in one direction only, in combination with a steam-chest having its face oppositely curved and fitting the valve-chest, and provided with ports or passages to convey the steam to and from either end of the oscillating cylinder, and oscillating from the center of the trunnions attached to the cylinder, substantially as and for the purpose specified.

4. In an oscillating steam-engine, a vertically-sliding valve-chest provided with steam and exhaust ports, and having its upper surface curved in one direction only, in combination with a steam-chest having its lower face oppositely curved and fitting the face of the valve-chest, and mechanism to cause the valve to vertically adjust itself and bear upon the steam-chest to take up all wear, substantially as and for the purpose specified.

5. An oscillating steam-engine provided with trunnions working in rigid bearings, and having a suitable oscillating steam-chest to convey steam to or from either end of the cylinder, in combination with a self-adjusting vertically-sliding valve-chest, which supplies steam to the steam-chest or allows exhaust to take place, and springs to keep the vertically-sliding valve-chest against the oscillating steam-chest for the purpose of taking up all wear and making a steam-tight joint, substantially as described.

6. In an oscillating steam-engine having trunnions working in rigid bearings, a vertically-sliding valve-chest having steam and exhaust ports registering with corresponding ports in the cylinder, substantially as and for the purpose specified.

7. In a reversible oscillating steam-engine, the combination of an oscillating cylinder having trunnions working in rigid bearings, and provided with an oscillating steam-chest, a vertically-sliding self-adjusting valve-chest provided with steam and exhaust ports, passages connecting with the ports, and a valve to cause either passage to supply steam or allow exhaust to or from the valve-chest, substantially as and for the purpose specified.

8. In an oscillating steam-engine, a standard consisting of a boiler provided with brackets to support the main shaft and a tube of greater diameter than the shaft riveted in the boiler and inclosing the shaft, in combination with an oscillating steam-cylinder and its appendages, substantially as set forth, the crank-wheel, and balance-wheel, the whole being secured to the same base, substantially as and for the purpose specified.

In testimony of which invention I hereunto set my hand.

HOSEA K. KRIEBEL.

Witnesses:
WM. S. BARCLAY,
A. DRESHER, Jr.